US009906775B2

(12) United States Patent  (10) Patent No.: US 9,906,775 B2
Seo et al.  (45) Date of Patent: Feb. 27, 2018

(54) DEVICE AND METHOD FOR MULTIVIEW IMAGE CALIBRATION

(71) Applicant: ELECTRONICS AND TELECOMMUNICATIONS RESEARCH INSTITUTE, Daejeon (KR)

(72) Inventors: Sang-Woo Seo, Daejeon (KR); Myung-Gyu Kim, Daejeon (KR); Ye-Jin Kim, Daejeon (KR); Jong-Sung Kim, Daejeon (KR); Seong-Min Baek, Daejeon (KR); Il-Kwon Jeong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 213 days.

(21) Appl. No.: 14/864,064

(22) Filed: Sep. 24, 2015

(65) Prior Publication Data

US 2016/0234479 A1  Aug. 11, 2016

(30) Foreign Application Priority Data

Feb. 9, 2015  (KR) ................... 10-2015-0019206

(51) Int. Cl.
*H04N 15/00* (2006.01)
*H04N 13/02* (2006.01)
*H04N 17/00* (2006.01)

(52) U.S. Cl.
CPC ..... *H04N 13/0282* (2013.01); *H04N 13/0242* (2013.01); *H04N 13/0246* (2013.01); *H04N 17/002* (2013.01)

(58) Field of Classification Search
CPC .......... H04N 13/0282; H04N 13/0242; H04N 13/0246; H04N 17/002
See application file for complete search history.

(56) References Cited

U.S. PATENT DOCUMENTS

| 7,023,473 | B2 | 4/2006 | Iwai et al. |
| 7,155,030 | B2 | 12/2006 | Kim et al. |
| 8,208,716 | B2 | 6/2012 | Choi et al. |
| 8,340,398 | B2 | 12/2012 | Park et al. |
| 8,619,144 | B1 | 12/2013 | Chang et al. |

(Continued)

FOREIGN PATENT DOCUMENTS

| EP | 1 622 083 A2 | 2/2006 |
| EP | 2 736 013 A2 | 5/2014 |

(Continued)

OTHER PUBLICATIONS

Kyuhyoung Choi et al, "Efficient Multi-Camera Calibration System", Journal of Korean institute of information technology, vol. 9-7, pp. 215-222, Jul. 7, 2011.

(Continued)

*Primary Examiner* — Nhon Diep
(74) *Attorney, Agent, or Firm* — LRK Patent Law Firm (57) ABSTRACT

This invention provides a device and a method of multi-view image calibration which can easily acquire calibration parameters (intrinsic/extrinsic parameter) of multi-image input device in wide space without separate calibration tool.

11 Claims, 8 Drawing Sheets

(56) References Cited

U.S. PATENT DOCUMENTS

| | | | |
|---|---|---|---|
| 8,666,154 B2* | 3/2014 | Sharman | G06T 7/44 348/222.1 |
| 9,247,214 B2* | 1/2016 | Aoki | G06T 7/85 |
| 9,626,765 B2* | 4/2017 | Ishimaru | G06T 7/262 |
| 2008/0198258 A1* | 8/2008 | Ito | H04N 5/23293 348/349 |
| 2009/0153745 A1 | 6/2009 | Park et al. | |
| 2010/0111370 A1* | 5/2010 | Black | G06K 9/00369 382/111 |
| 2011/0187829 A1* | 8/2011 | Nakajima | H04N 13/02 348/46 |
| 2015/0124062 A1* | 5/2015 | Didyk | H04N 13/0011 348/51 |

FOREIGN PATENT DOCUMENTS

| | | |
|---|---|---|
| KR | 10-2002-0014456 A | 2/2002 |
| KR | 10-2002-0077685 A | 10/2002 |
| KR | 10-0916588 B1 | 9/2009 |
| KR | 10-0918480 B1 | 9/2009 |
| KR | 10-0924121 B1 | 10/2009 |
| KR | 10-2012-0133041 A | 12/2012 |
| KR | 10-2013-0035422 A | 4/2013 |
| KR | 10-2014-0114594 A | 9/2014 |

OTHER PUBLICATIONS

Tomas Svoboda et al, "A Convenient Multi-Camera Self-Calibration for Virtual Environments" PRESENCE: Teleoperators and Virtual Environment, pp. 407-422, Aug. 2005.

Ivo Ihrke et al, "External camera calibration for synchronized multi-video systems", Journal of WSCG, pp. 12-1, 2004.

Sang-Woo Seo et al, "Multiple Camera Calibration based on Human Motion", 2014 Korea Signal Processing Conference, vol. 27-1, pp. 1-2, Sep. 26, 2014.

* cited by examiner

(a) time point 1   (b) time point 2   (c) time point 3

DEVICE AND METHOD FOR MULTIVIEW IMAGE CALIBRATION

CROSS-REFERENCE TO RELATED APPLICATIONS

This application claims the benefit of Korean Patent Application No. 10-2015-0019206 filed with the Korean Intellectual Property Office on Feb. 9, 2015, the entire disclosure of which is incorporated herein by reference.

BACKGROUND

1. Technical Field

The present invention relates to a device and a method for multi-view image calibration, and more particularly, a method for multi-view image calibration for producing calibration parameters without calibration tool.

2. Description of the Related Art

According to a market report, the market size of the three-dimensional animation is expected to get bigger each year, and motion capture technology and model restoration technology for 3D animation have been increasingly developed. For motion capture for 3D animation, a plurality of cameras are used to take the multi-view image. The plurality of cameras cause the problem that vertical error and irregular time interval may occur.

The related arts are disclosed in Published Korean Patent Application 10-2002-0014456 (published on Feb. 25, 2002) "A METHOD AND SYSTEM OF REVISION FOR 3-DIMENSIONAL IMAGE."

SUMMARY OF THE INVENTION

This invention thus provides with a device and a method for multi-view image calibration which can produce calibration parameters of multi-view image without special calibration tool.

The objects of this invention are not limited to those mention above, another objects not mentioned can be apparently understood by the following description.

An aspect of this invention provides a multi-view image calibration device including: an image input synchronizing means for synchronizing a multi-image input device which takes pictures of an object at multiple view points; an image capturing means for inputting multi-view images in synchronization from the multi-image input device; a characteristic point detecting means for detecting characteristic points of the multi-view images; a corresponding point set generating means for selecting corresponding point(s) among the detected characteristic points and for generating a corresponding point set; and a calibration parameter generating means for producing calibration parameters of the multi-image input device from the generated corresponding point set.

Another aspect of this invention provides a multi-view image calibration method including the steps of: inputting multi-view images in synchronization from a multi-image input device; detecting characteristic points with respect to the multi-view images; selecting corresponding points among the detected characteristic points so as to generate a corresponding point set; and generating calibration parameters of the multi-image input device from the generated corresponding point set.

The present invention has the advantage of reducing the consumption of time and material resources, because the constraint of space is comparatively less than that of the calibration using a calibration tool, and there is no need to make a separate calibration tool.

DETAILED DESCRIPTION OF THE INVENTION

Hereinafter the embodiments of this invention will be in detail explained with reference to the attached drawings, so that those skilled in this art should implement this invention. The present invention, however, can be implemented in various types and is not limited to the following embodiment. In addition, the expression of "comprising" means that it could be interpreted as "further includes" but it could not be interpreted as "exclude additional component", unless otherwise mentioned.

Figure 1:
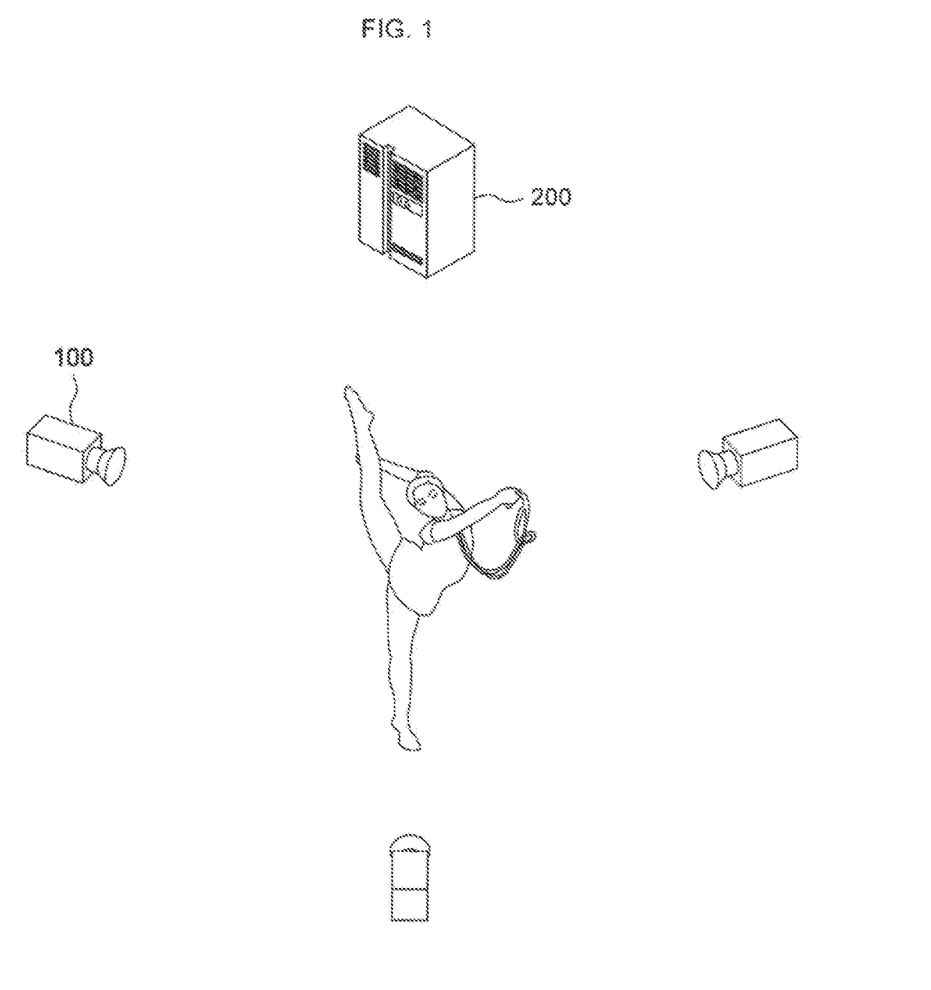
FIG. 1 and FIG. 2 are drawings for illustrating the multi-view image calibration system according to one embodiment of this invention.
Figure 2:
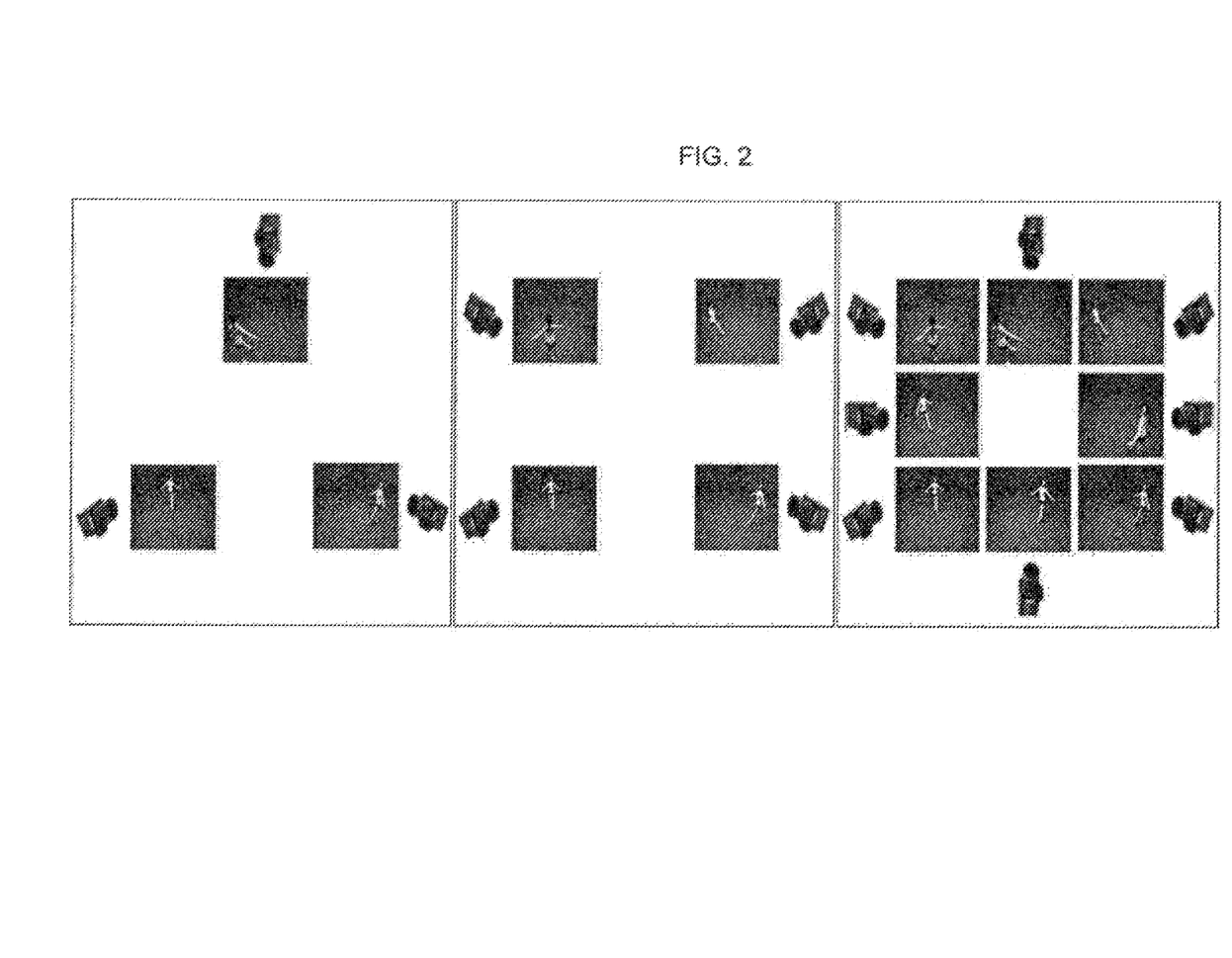

FIG. 1 and FIG. 2 are drawings for illustrating the multi-view image calibration system according to one embodiment of this invention.

Referring to FIG. 1, the multi-view image calibration system comprises a multi-image input device 100 and a multi-view image calibration device 200.

The multi-image input device 100 is a device of image input device for taking pictures of object at multiple viewpoints. The multi-image input device 100 takes pictures of moving object in synchronization and produces multi-viewpoints images. The multi-image input device 100 can be, for example, a camera device.

Referring to FIG. 2, the multi-image input device 100 can comprises at least three camera devices. In the multi-image input device 100, the more of the images captured at the same time causes the higher accuracy of calibration but the slower processing speed of input image. Also, in the multi-image input device 100, the less of images captured at the same time causes the lower calibration accuracy but the higher processing speed is. Thus, in the multi-image input device, the number of camera device can be controlled in accordance with the calibration accuracy and the image processing speed of the multi-view image calibration device 200.

The multi-view image calibration device 200 processes the synchronized image of multi-viewpoints inputted through the multi-image input device 100 and produces calibration parameters of the multi-image input device 100. The multi-view image calibration device 200 may be a computer apparatus physically including a processor, a memory, an input/output device, and a communication interface. The multi-view image calibration device 200 may be an image processing device for executing a multi-view image calibration program.

The multi-view image calibration device 200 controls the multi-image input device 100 such that the multi-image input device take synchronized pictures of object, and detects the characteristic point(s) in the inputted multi-view image(s). Then, the multi-view image calibration device 200 selects corresponding point(s) in the multi-view image(s), tracks the corresponding point(s) of the every image inputted and processed, and generates a corresponding point set. Then the multi-view image calibration device 200 generates calibration parameter(s) of the multi-image input device 100 using the generated corresponding point set.

Figure 3:
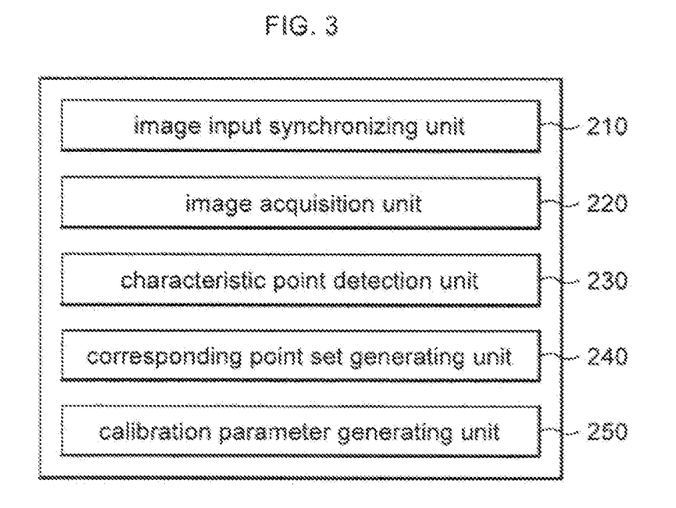
FIG. 3 and FIG. 4 are drawings for illustrating the multi-view image calibration device according to one embodiment of this invention.
Figure 4:
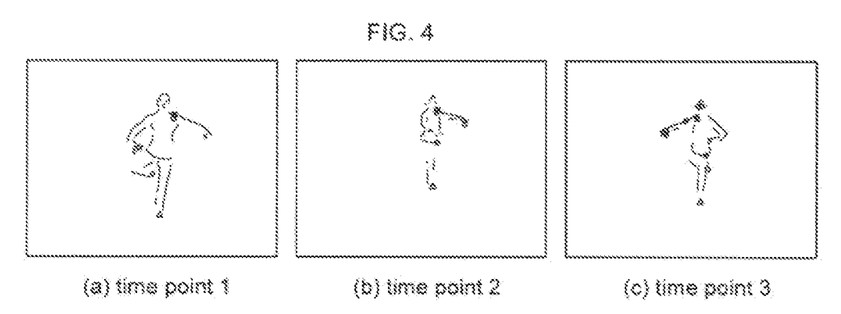

FIG. 3 and FIG. 4 are drawings for illustrating the multi-view image calibration device according to one embodiment of this invention.

Referring to FIG. 3, the multi-view image calibration device 200 includes an image input synchronizing unit 210, an image acquisition unit 220, a characteristic point detection unit 230, a corresponding point set generating unit 240, and a calibration parameter generating unit 250.

The image input synchronizing unit 210 synchronizes multi-image input device(s) 100 which take pictures of object(s) so as to synchronize the multi-view images inputted.

The image acquisition unit 220 inputs the synchronized multi-view image generated from, the multi-image input device 100.

The characteristic point detection unit 230 detects characteristic point(s) among the multi-view image inputted. Here, the characteristic point(s) means the point(s) that can be distinguished from ambient background and can be easily identified because the point is little affected by different viewpoints and lights, to be selected as reference point(s) for matching every multi-view image. The characteristic point detection unit 230 performs color-conversion of every multi-view image inputted for selecting the characteristic point(s) and performs the corner-detection method. Here, the color-conversion can be HSV (Hue-Saturation-Value) color conversion, and the corner detection method can use the corner detection method based on brightness and contour. Referring to FIG. 4, the characteristic point detection unit 230 can detect a plurality of characteristic points 410 to 430 in the multi-view image through the color-conversion and the corner detection method.

The corresponding point set generating unit 240 selects the characteristic point(s) little affected by different viewpoints among the characteristic point(s) as corresponding point(s), and tracks the selected corresponding point(s) of every multi-view image inputted so as to generate corresponding point set. The corresponding point set generating unit 240 can select at least three corresponding points per one viewpoint for the sake of accuracy. Also, the corresponding point set generating unit 240 can eliminate the erroneously detected corresponding point(s) among the selected corresponding point(s) and can add the missed corresponding point(s) by interpolation. For this, the corresponding point set generating unit 240 can use, for example, RANSAC (RANdom Sample Consensus) method or the like.

The calibration parameter generating unit 250 performs matrix-factorization from the selected corresponding point set to produce calibration parameter(s) of the multi-image input device 100.

FIG. 5 to FIG. 10 are drawings for illustrating, the multi-view image calibration method according to one embodiment of this invention.

Figure 5:
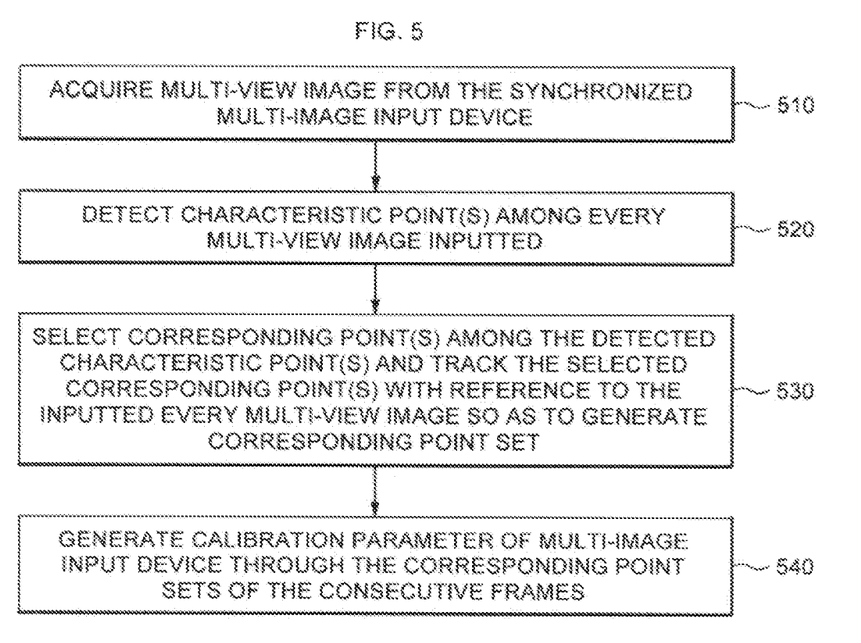
FIG. 5 through FIG. 10 are drawings for illustrating the multi-view image calibration method according to one embodiment of this invention.

Referring to FIG. 5, the multi-view image calibration device 200 acquires multi-view images from the synchronized multi-image input device 100 in step S510.

The multi-view image calibration device 200 detects the characteristic points of the every multi-view image inputted, in step S520. The multi-view image calibration device 200, as mentioned above, can detect the point(s) which can be distinguished from ambient background and can be easily identified due to less effect of viewpoint and light, through the HSV (Hue-Saturation-Value) color-conversion and the bright and contour based corner detection method.

The multi-view image calibration device 200 selects corresponding points among the detected characteristic point(s) in step S530, and generates a corresponding point set by tracking the selected corresponding point(s) of every multi-view image inputted. This will be in more detail explained with reference to FIG. 6 and FIG. 7.

The multi-view image calibration device 200 generates calibration parameter(s) of the multi-image input device 100 through the corresponding point sets of consecutive frames in step S540.

Figure 6:
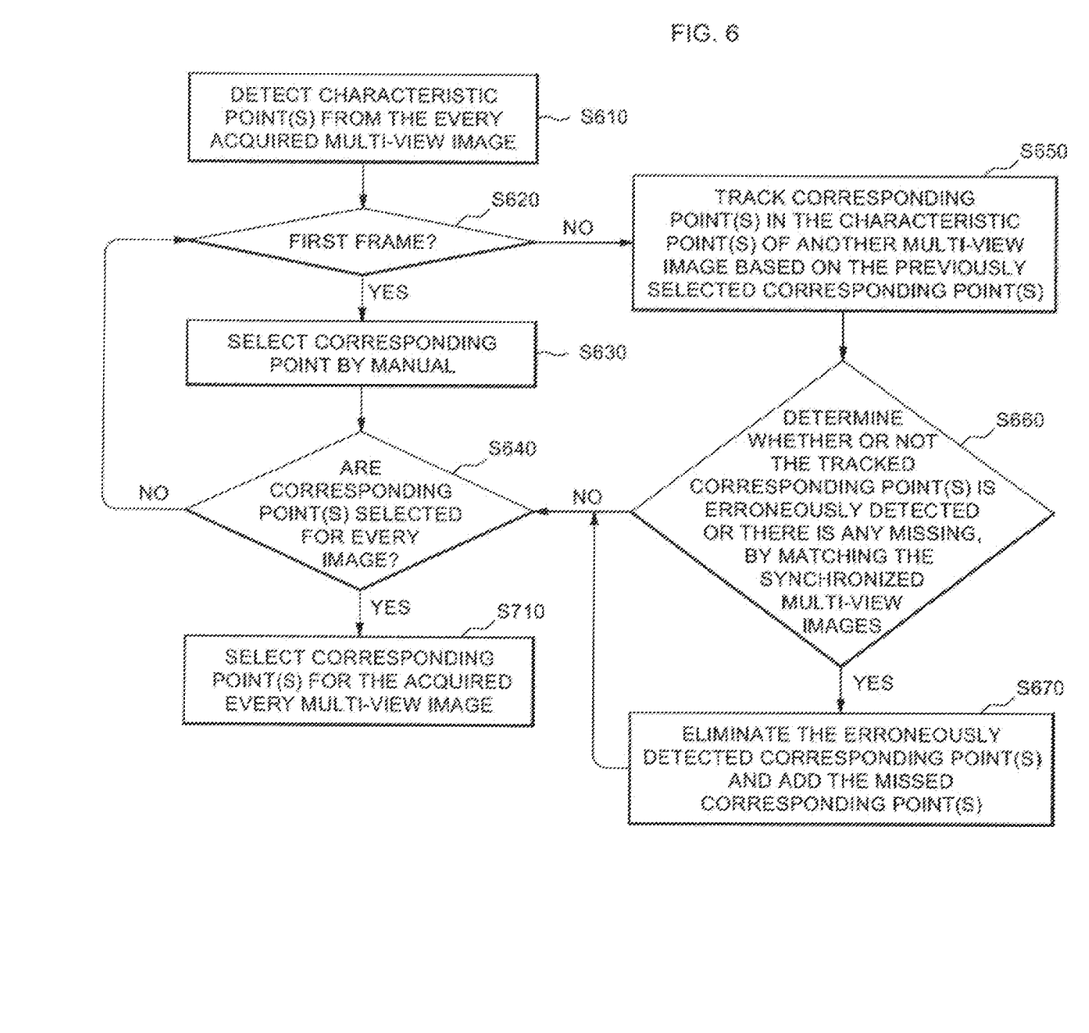

Hereinafter, the method of precisely selecting corresponding point(s) in every multi-view image inputted with reference to FIG. 6.

The multi-view image calibration device 200 detects characteristic point(s) of the every multi-view image acquired, in step S610.

The multi-view image calibration device 200 determines whether the image is the first frame image in which the detected characteristic point(s) would be selected as corresponding point(s), in step S620.

In step S630, The multi-view image calibration device 200 selects corresponding point(s) among the characteristic point(s) in case the result of step S620 is the first frame image in which the detected characteristic point(s) would be selected as corresponding point(s). Here, the corresponding point can be selected so as to be on the same three-dimensional space with respect to at least three view-points, and at least three corresponding points can be selected per one viewpoint for the sake of accuracy. Referring to FIG. 4, at least three corresponding points can be selected among the detected characteristic points.

The multi-view image calibration device 200 determines whether corresponding points be selected for the every multi-view image inputted, in step S640.

In step S650, the multi-view image calibration device 200 tracks the corresponding points among the characteristic point(s) of another multi-view image, based on the previously selected corresponding point(s), in case that the determination result is that corresponding point is not selected for the every multi-view image inputted.

The multi-view image calibration device 200 determines whether or not the tracked corresponding point(s) is erroneously detected or there is any missing, by matching the synchronized multi-view images for every multi-view image, in step S660.

The multi-view image calibration device 200 eliminates the erroneously detected corresponding point(s) and adds the missed corresponding point(s), in case the determination result is that the tracked corresponding point(s) is erroneously detected or missed in every multi-view image, in step S670. The multi-view image calibration device 200 can eliminate the noise included in the corresponding point(s) using Kalman Filter which is a recursive filter to track the state of a linear dynamic system including the noise. The multi-view image calibration device 200 can add the missed corresponding point using interpolation method.

Figure 7:
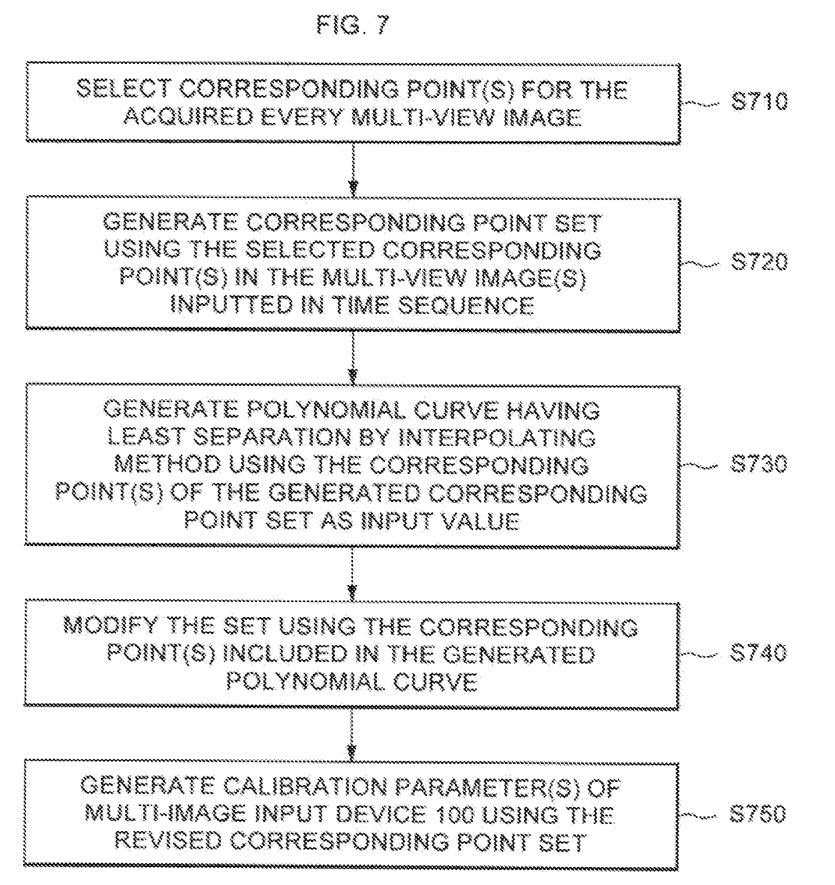

Hereinafter it will be explained the method for generating calibration parameters using the selected corresponding points in every multi-view image inputted, with reference to FIG. 7.

The multi-view image calibration device 200 selects the corresponding points of the acquired every multi-view image, in step S710.

Figure 8:
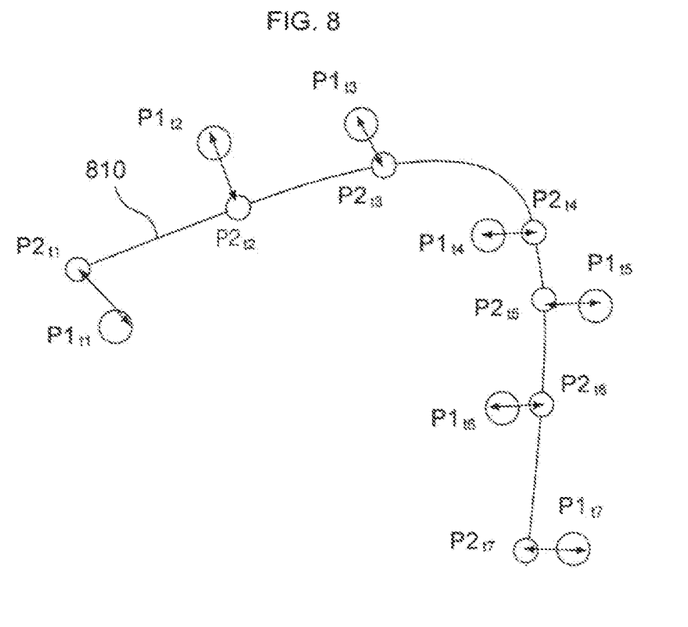
Figure 9:
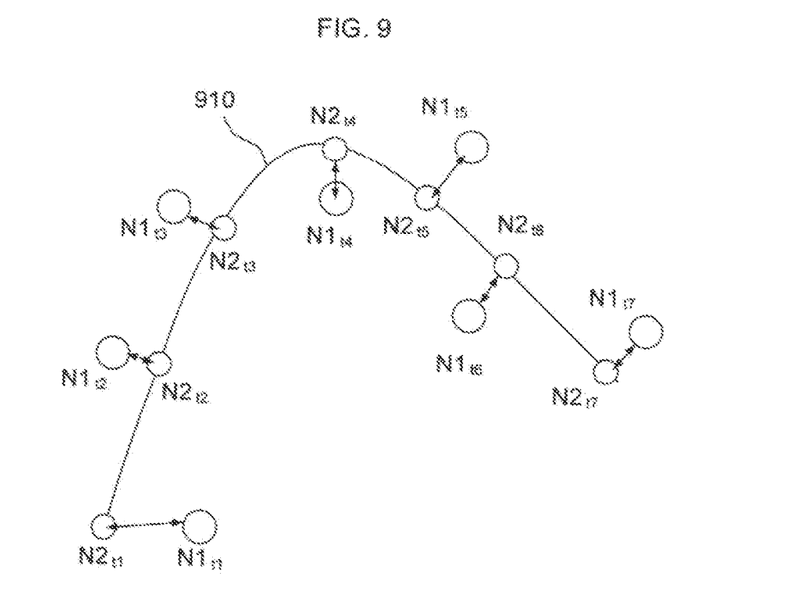

The multi-view image calibration device 200 generates a corresponding point set using the selected corresponding points in multi-view image inputted in time sequence, in step S720. Referring to FIG. 8 and FIG. 9, the corresponding point set can be set, for example P1t1, . . . , P1t7 can be set as a first corresponding point set and, N1t1, . . . , N1t7 can be set as a second corresponding point set.

The multi-view image calibration device 200 generates a polynomial curve having least separation by interpolation method using the corresponding points of the generated corresponding point set as input values in step S730. Referring to FIG. 8 and FIG. 9, a first polynomial curve 810 and a second polynomial curve 910 having least separation for the first corresponding point set and the second corresponding point set respectively can be generated. Here, the following equation 1 can be used for seeking the polynomial curve having least separation.

$$\text{Min}\left(\frac{\sum_{i=1}^{M}\left|\sqrt{P_{2ti_x}^2+P_{2ti_y}^2+P_{2ti_z}^2}-\sqrt{P_{1ti_x}^2+P_{1ti_y}^2+P_{1ti_z}^2}\right|}{M},\right.$$
$$\left.\frac{\sum_{i=1}^{M}\left|\sqrt{N_{2ti_x}^2+N_{2ti_y}^2+N_{2ti_z}^2}-\sqrt{N_{1ti_x}^2+N_{1ti_y}^2+N_{1ti_z}^2}\right|}{M}\right)$$

[Equation 1]

Then the multi-view image calibration device 200 modifies the set of corresponding points included in the generated polynomial curve in step S740. Referring to FIG. 8 and FIG. 9, the modified corresponding point set included in the polynomial curve can be set, for example, P2t1, . . . , P2t7 as the first corresponding point set and N2t1, . . . , N2t7 as the second corresponding point set.

The multi-view image calibration device 200 generates calibration parameters of the multi-image input device 100 using the compensated corresponding point set in step S750.

Hereinafter, referring to FIG. 10, it will be explained the generating method of calibration parameters of the multi-image input device 100 in the compensated corresponding point set.

Figure 10:
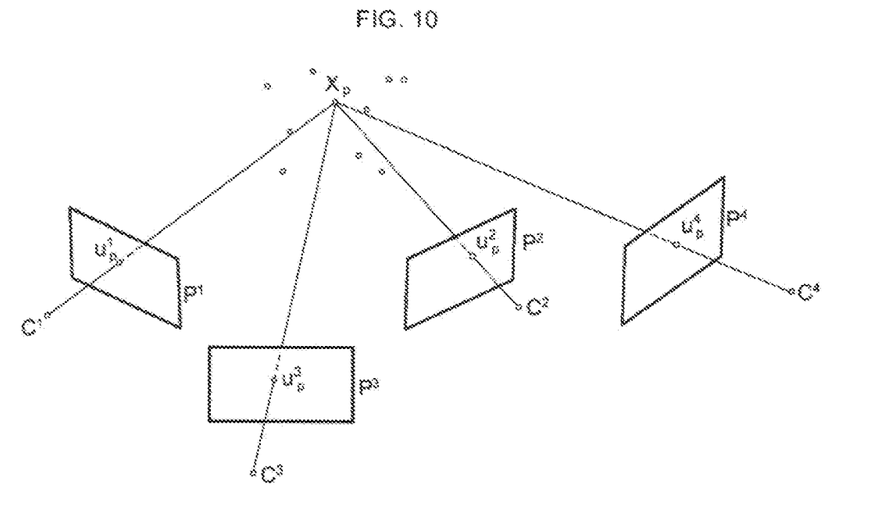

Referring to FIG. 10, in case there are m (natural number) multi-image input devices and n (natural number) corresponding points and $X_p=\{x_p,y_p,z_p,1\}^T$, p=1, . . . , n, the two-dimensional image point $u_p^i$ can be written as the following Equation 2

$$\lambda_p^i\begin{bmatrix}x_p^i\\y_p^i\\1\end{bmatrix}=\lambda_p^i u_p^i=P^i X_p,\ \lambda_p^i\in R^+$$

[Equation 2]

In Equation 2, $P^i$ is a Projection Matrix and each of multi-image input devices 100 includes extrinsic parameter(s) and intrinsic parameter(s).

Here, the extrinsic parameter is a parameter related to geometrical relationship with the external space of the multi-image input device such as the installation height and the direction (pan, tilt) etc. of the multi-image input device, which may include six information. The intrinsic parameter is an internal parameter such as focus length and center point etc. of the multi-image input device, which may include five information. Using the corresponding points $u_p^i$ measured in previous step, the scale value $\lambda_p^i$ is produced to be used for generating the projection matrix value $P^i$.

The scale value $\lambda_p^i$, is set in two stereo images i and c, $\lambda_p^c=1$ is set for every p corresponding to the point $u_p^c$ in each of multi-image input device c, and an Unique Fundamental Matrix is produced for i≠ic≠c which can be used for producing the Fundamental Matrix $F^{ic}$ as the following and can be used for producing an epipole $e^{ic}$ which is the position of the multi-image input device shown in image, and depth value $\lambda_p^i$, $$\lambda_p^i=\frac{(e^{ic}\times u_p^i)\cdot(F^{ic}u_p^c)}{\|e^{ic}\times u_p^i\|^2}\lambda_p^c$$

[Equation 3]

Ws is obtained using the depth value of Equation 3 and $P^i$ Projection Matrix may be produced using the Equation 4.

$$W_s=\begin{bmatrix}\lambda_1^1\begin{bmatrix}x_1^1\\y_1^1\\1\end{bmatrix}&\cdots&\lambda_n^1\begin{bmatrix}x_n^1\\y_n^1\\1\end{bmatrix}\\\vdots&\ddots&\vdots\\\lambda_1^m\begin{bmatrix}x_1^m\\y_1^m\\1\end{bmatrix}&\cdots&\lambda_n^m\begin{bmatrix}x_n^m\\y_n^m\\1\end{bmatrix}\end{bmatrix}=\begin{bmatrix}p^1\\\vdots\\p^m\end{bmatrix}_{3m\times 4}[X_1\ \ldots\ X_n]_{4\times n}$$

[Equation 4]

Here, $W_s=PX$, $P[p^1\ \ldots\ p^m]^T$, $X=[X_1\ \ldots\ X_n]$

The multi-view image calibration method generates $P^i$ projection matrix of the multi-image input device so as to produce calibration parameters of the multi-image input device.

The multi-view image calibration method according to the various embodiments of this invention may be implemented in a program instruction that can be carried out via a variety of computer means such as a variety of servers.

Also, the program for executing the multi-view image calibration method according to the present invention may be installed in the computer means and may be recorded in computer readable medium. The computer readable medium includes program command, data file, data structure etc. alone or in combination.

The program command recorded in the computer readable medium may be specially designed and made for this invention or may be known to those skilled in the computer software field so as to be available.

The examples of computer readable medium includes a magnetic media such as a hard-disk, a floppy-disk and a magnetic tape, an optical media such as CD-ROM and DVD, a magneto-optical media such as floptical disk, a hardware apparatus specially implemented for storing and performing the program command such as ROM, RAN, flash memory etc. Up to now the embodiments of this invention have been described. However, the description of the present invention described above are intended to be illustrative, those skilled in the art pertain to this invention can understand that this invention can be easily modified in other specific embodiments without changing the technical spirit or essential features of the invention. Therefore, the exemplary embodiments disclosed in the present invention and the accompanying drawings do not limit but describe the spirit of the present invention, and the scope of the present invention is not limited by the exemplary embodiments and accompanying drawings.

What is claimed is:

1. A multi-view image calibration device comprising:
one or more units being configured and executed by a processor using algorithm associated with least one non-transitory storage device, the one or more units comprising,
an image input synchronizing unit for synchronizing a multi-image input device which takes pictures of an object at multiple view points;
an image capturing unit for inputting multi-view images in synchronization from the multi-image input device;
a characteristic point detecting unit for detecting characteristic points of the multi-view images;
a corresponding point set generating unit for selecting corresponding point(s) among the detected characteristic points and for generating a corresponding point set,
in response to detection of the corresponding point(s) being selected for the every inputted multi-view image, the corresponding point set generating unit for tracking corresponding point(s) in characteristic point(s) of image of different time point based on previously selected corresponding point(s),
for determining whether corresponding point(s) tracked is erroneously detected or any missing being made, and
in response to detection of the corresponding point(s) tracked being erroneously detected or any missing is made, the corresponding point set generating unit for eliminating the corresponding point(s) erroneously detected and adding the corresponding point(s) missed by interpolation; and
a calibration parameter generating unit for producing calibration parameters of the multi-image input device from the generated corresponding point set.

2. The multi-view image calibration device according to claim 1, wherein the image input synchronizing unit synchronizes at least three multi-image input devices.

3. The multi-view image calibration device according to claim 1, wherein the characteristic point detecting unit makes color-conversion of the multi-view image, and detects the characteristic points using corner-detecting method.

4. The multi-view image calibration device according to claim 1, wherein the corresponding point set generating unit selects corresponding points with respect to every multi-view image, compares the synchronized multi-view images and tracks the corresponding points.

5. The multi-view image calibration device according to claim 4, wherein the corresponding point set generating unit generates the corresponding point set using the corresponding points selected among multi-view images inputted in time sequence.

6. The multi-view image calibration device according to claim 5, wherein the corresponding point set generating unit inputs the corresponding points of the generated corresponding point set so as to generate a polynomial curve having least separation using interpolating method, and generates a calibrated corresponding point set included in the generated polynomial curve.

7. The multi-view image calibration device according to claim 1, wherein the calibration parameter generating unit generates a projection matrix including an extrinsic parameter and an intrinsic parameter of the multi-image input device.

8. A computer-implemented multi-view image calibration method comprising the steps of:
inputting multi-view images in synchronization from a multi-image input device;
detecting characteristic points with respect to the multi-view images;
selecting corresponding points among the detected characteristic points so as to generate a corresponding point set; and
generating calibration parameters of the multi-image input device from the generated corresponding point set, wherein the step of selecting corresponding points among the detected characteristic points so as to generate a corresponding point set comprises the steps of:
selecting corresponding point among the characteristic point in case a frame is a first frame in which corresponding point(s) should be selected among the detected characteristic point(s);
determining whether corresponding point(s) is selected for the every inputted multi-view image;
in response to detection of the corresponding point(s) being selected for the every inputted multi-view image, tracking corresponding point(s) in characteristic point(s) of image of different time point based on previously selected corresponding point(s);
matching images of a plurality of time points in the every multi-view image so as to determine whether corresponding point(s) tracked is erroneously detected or any missing is made; and
in response to detection of the corresponding point(s) tracked being erroneously detected or any missing is made, eliminating the corresponding point(s) erroneously detected and adding the corresponding point(s) missed by interpolation.

9. The multi-view image calibration method according to claim 8, wherein the step of detecting characteristic points with respect to the multi-view images comprises the steps of:
making color-conversion the multi-view image; and
detecting the characteristic point(s) among the color-converted multi-view image using corner-detection method.

10. The multi-view image calibration method according to claim 8, wherein the step of selecting corresponding points among the detected characteristic points so as to generate a corresponding point set comprises the steps of:
generating a corresponding point set using corresponding point(s) selected from the multi-view image inputted in time sequence;
generating a polynomial curve having least separation by interpolation using corresponding points of the generated corresponding point set as input values; and
modifying the set of the corresponding point(s) included in the generated polynomial curve.

11. The multi-view image calibration method according to claim 8, wherein the step of generating calibration parameters of the multi-image input device from the generated corresponding point set comprises the steps of:
generating scale value(s) from the corresponding point set; and
generating projection matrix value using the scale value(s), wherein the projection matrix value includes an extrinsic parameter and an intrinsic parameter of the multi-image input device.

* * * * *